United States Patent
Su

(10) Patent No.: US 6,264,159 B1
(45) Date of Patent: Jul. 24, 2001

(54) UNIVERSAL CAR SEAT-ADJUSTING SLIDE RAIL STRUCTURE

(75) Inventor: Yun-Chin Su, Taipei (TW)

(73) Assignee: Pro-Glory Enterprises Co., Ltd., Taipei (TW)

( * ) Notice: Subject to any disclaimer, the term of this patent is extended or adjusted under 35 U.S.C. 154(b) by 0 days.

(21) Appl. No.: 09/478,146

(22) Filed: Jan. 5, 2000

(51) Int. Cl.[7] .................................................. F16M 13/00
(52) U.S. Cl. .......................................................... 248/430
(58) Field of Search ................................. 248/424, 429, 248/430; 296/65.13; 297/341

(56) References Cited

U.S. PATENT DOCUMENTS

| | | | | |
|---|---|---|---|---|
| 6,036,267 | * | 3/2000 | Downey et al. | 397/341 |
| 6,059,345 | * | 5/2000 | Yokota | 296/65.13 |
| 6,102,478 | * | 8/2000 | Christopher | 297/341 |
| 6,126,133 | * | 10/2000 | Timon et al. | 248/429 |

\* cited by examiner

*Primary Examiner*—Ramon O. Ramirez
(74) *Attorney, Agent, or Firm*—Pro-Techtor International Services

(57) ABSTRACT

Universal car seat-adjusting slide rail structure including a slide bar and a slide frame. The slide bar is supported by multiple ball members and plastic circular rods and stably slidably fitted in a slide channel of the slide frame. The surface of the slide bar is formed with multiple locating holes and two connecting lugs are respectively detachably locked at two ends of the slide bar by screws. Therefore, a user can selectively directly lock the slide bar on the bottom face or front and rear sides of the car seat in accordance with the type thereof. Alternatively, the slide bar can be locked on left and right sides of the car seat via an L-shaped auxiliary board so that the slide bar can be widely applied to various kinds of car seats. Moreover, a resilient member is disposed between a fixing section of the slide frame and the clutch control bar. One end of the resilient member is wound and fixed on the fixing section, while the other end thereof is fixedly engaged with the clutch control bar in reverse direction so as to prevent the resilient member from dropping. A fixing spring is passed through the pivot section at one end of the clutch control bar to prevent the arch rod from detaching from the clutch control bar.

3 Claims, 8 Drawing Sheets

UNIVERSAL CAR SEAT-ADJUSTING SLIDE RAIL STRUCTURE

BACKGROUND OF THE INVENTION

The present invention relates to a car seat-adjusting slide rail structure, and more particularly to a universal car seat-adjusting slide rail structure which can be durably used and widely applied to various kinds of car seats.

The seat in a car is generally assembled with a slide rail structure including a slide frame and a slide bar. By means of the slide rail structure, the seat can be slided back and forth or even left and right.

FIG. 1 shows a conventional slide rail structure for adjusting the position of a car seat. The slide rail structure is composed of a slide frame 20 and a slide bar 10 slidably fitted in the slide way of the slide frame 20 via two plastic balls. The slide bar 10 is formed with two opposite locating holes 11. A screw is passed through the locating hole 11 to lock the slide bar 10 with the bottom of the seat. The slide frame 20 is formed with two opposite through holes for a screw to pass therethrough to lock and locate the slide frame 20 on the chassis of the car. In order to slidably engage and locate the slide bar 10 within the slide frame 20, one side of the slide frame 20 is formed with a perforation 21 and disposed with a clutch control bar 22 having an engaging section 23. A middle portion of the clutch control bar 22 is locked and fixed on the slide frame 20 by screws. The engaging section 23 passes through the perforation 21 to engage with the teeth 12 of the slide bar 10. The clutch control bar 22 is further disposed with a resilient member 24, whereby when depressing one end of the clutch control bar 22, the engaging section 23 is controllably disengaged from the teeth 12. When released, the resilient member 24 will resiliently make the engaging section 23 re-engaged with the teeth 12. Therefore, a user can conveniently operate the slide rail structure.

However, the above slide rail structure has some shortcomings as follows:

1. The locating holes of the slide bar have fixed distance so that the slide bar can be only installed on a specific car seat. Therefore, the application of the slide rail structure is limited and thus the slide rail structure can be hardly widely used.
2. Only two plastic balls are disposed between the slide bar and the slide frame, serving as bearings and achieving a balancing effect. However, the two plastic balls only provide two contact points and are subject to wearing. Therefore, with the worn plastic balls, a gap will exist between the slide bar and the slide frame. This will result in linear deflection of the slide rail. As a result, when a user sits on the seat, the seat will swing to make the user feel uncomfortable.

FIG. 2 shows an improved seat-adjusting slide rail structure in which the slide bar 10 via several ball members (not shown) is slidably fitted in a slide channel of the slide frame 20 serving as a slide rail. One side of the slide frame 20 is formed with a perforation 21 and disposed with a clutch control bar 22. One end of the clutch control bar 22 is formed with an engaging section 23 passing through the perforation 21 to engage with the teeth 12 of the slide bar 10. The engaging section 23 is connected with a resilient member 24 for resiliently restoring the engaging section 23 to its home position. The other end of the clutch control bar 22 is formed with a U-shaped insertion section 25 for an arch rod 26 to insert therein and formed with a projection 27 for fitting into a through hole formed at the end of the arch rod 26. Accordingly, a user can force the arch rod 26 to make the engaging section 23 of the clutch control bar 22 disengaged from the teeth 12 and permit the slide bar 10 to freely slide along the slide frame 20. When releasing the arch rod 26, the resilient member 24 serves to resiliently make the engaging section 23 re-engaged with the teeth 12 and locate the slide bar 10. In this slide rail structure, several ball members are used instead of the plastic balls so that the problem of unbalancing and linear deflection caused by the wearing of the plastic balls is eliminated. However, such slide rail structure still has some shortcomings in durability and safety as follows:

1. The arch rod is located in the U-shaped insertion section of the clutch control bar and the end of the arch rod fitted with the projection of the clutch control bar serves as the fulcrum of the arch rod for swinging, whereby the arch rod can be operated to engage the clutch control bar with the slide bar or disengage the clutch control bar from the slide bar. Such arch rod is subject to detachment due to collision. This will make the arch rod lose its function. In addition, the force application point of the arch rod is the U-shaped insertion section so that this section tends to break off.
2. The resilient member (as shown in FIG. 2) has two bent hook sections at two ends, which are hooked and hung on the engaging section. In use, the resilient member may be bounded out. Under such circumstance, it is impossible to resiliently restore the clutch control bar to its home position. Therefore, the resilient member has very poor durability.

SUMMARY OF THE INVENTION

It is therefore a primary object of the present invention to provide a universal car seat-adjusting slide rail structure which has good durability and can be widely applied to various kinds of car seats.

According to the above object, the surface of the slide bar of the slide rail structure is formed with multiple locating holes, whereby the slide bar can be directly locked on the bottom face of the car seat in accordance with the type thereof. Alternatively, two connecting lugs formed with several through holes are respectively detachably locked at two ends of the slide bar by screws, whereby the slide bar can be locked on the front and rear sides of the car seat. Still alternatively, with the connecting lugs removed, an L-shaped auxiliary board can be locked at the locating holes of the slide bar, whereby through the L-shaped auxiliary board, the slide bar can be locked on left and right sides of the car seat. Therefore, the slide bar can be widely applied to various kinds of car seats. In addition, the clutch control bar is locked on a fixing section on one side of the slide frame for engaging with or releasing the slide bar, One end of the clutch control bar is disposed with a pivot section on which an arch rod for controlling the adjustment of the car seat is fitted. A fixing spring is passed through the pivot section to prevent the arch rod from detaching from the clutch control bar. The other end of the clutch control bar is formed with an engaging section for engaging with the teeth of the slide bar. A resilient member is disposed between a fixing section of the slide frame and the clutch control bar. One end of the resilient member is wound and fixed on the fixing section, while the other end thereof is fixedly engaged with the clutch control bar in reverse direction so as to prevent the resilient member from dropping and losing its function.

The present invention can be best understood through the following description and accompanying drawings wherein:

DETAILED DESCRIPTION OF THE PREFERRED EMBODIMENTS

Figure 1:
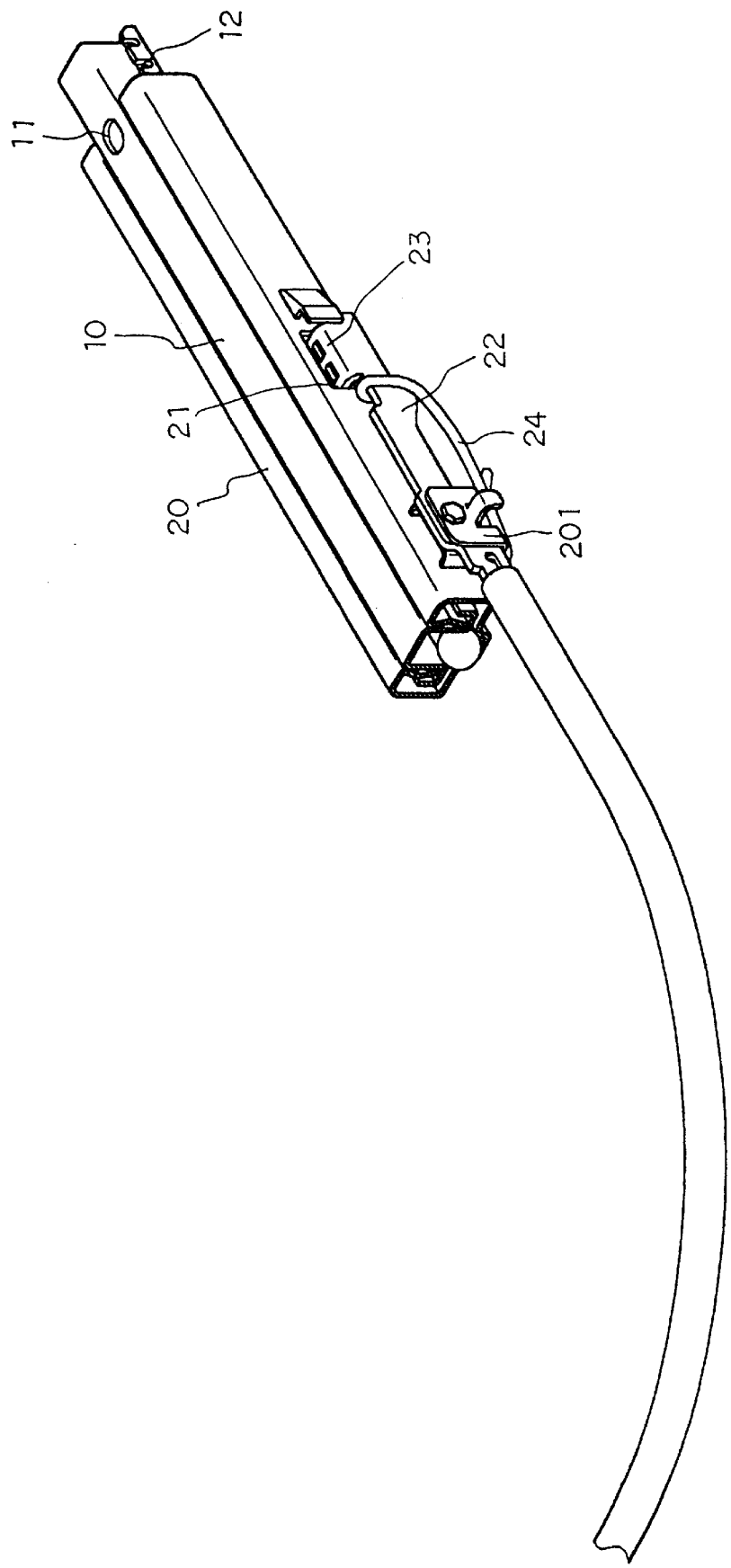
FIG. 1 is a perspective assembled view of a conventional slide rail structure.
Figure 2:
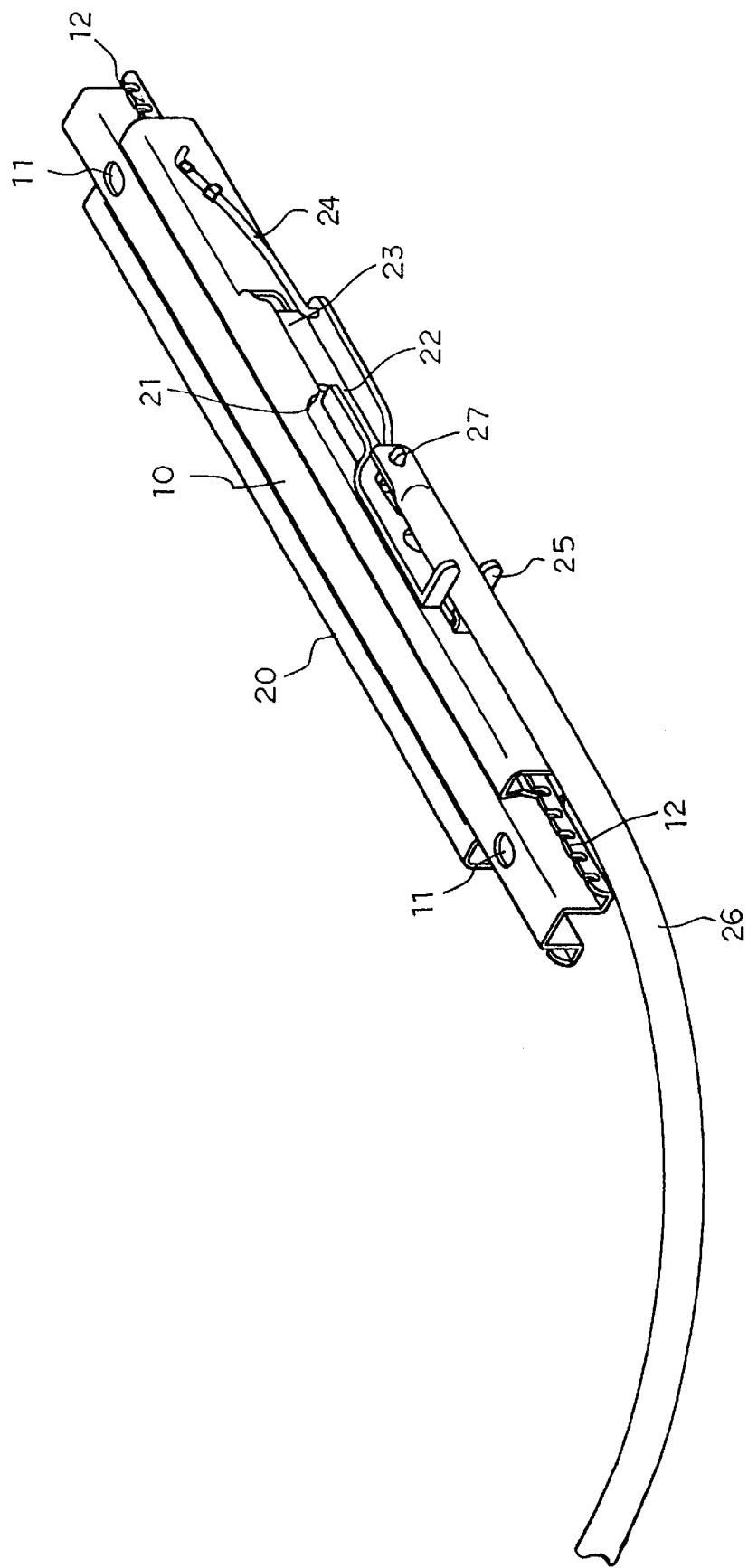
FIG. 2 is a perspective assembled view of another conventional slide rail structure.
Figure 3:
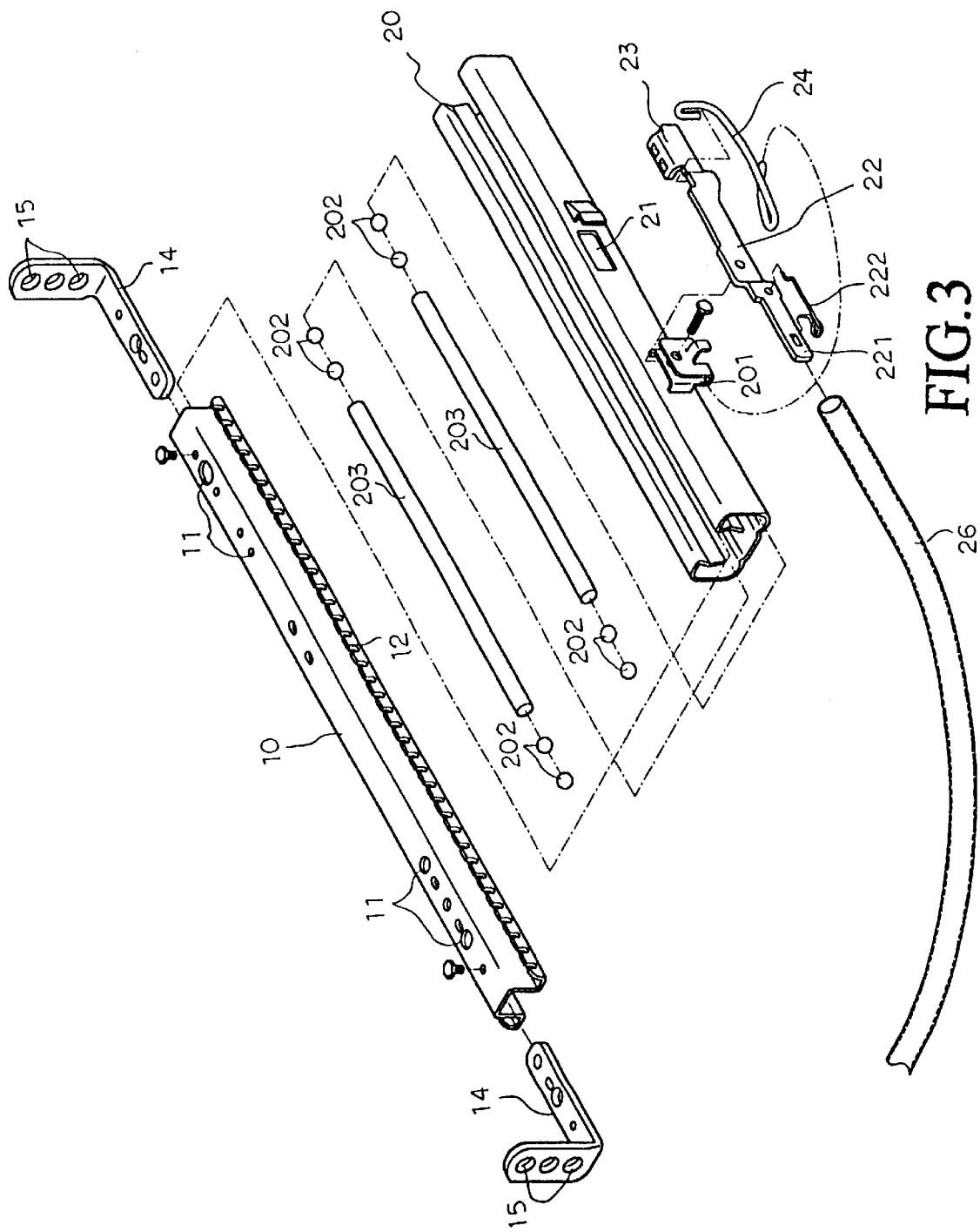
FIG. 3 is a perspective exploded view of the slide rail structure of the present invention.
Figure 4:
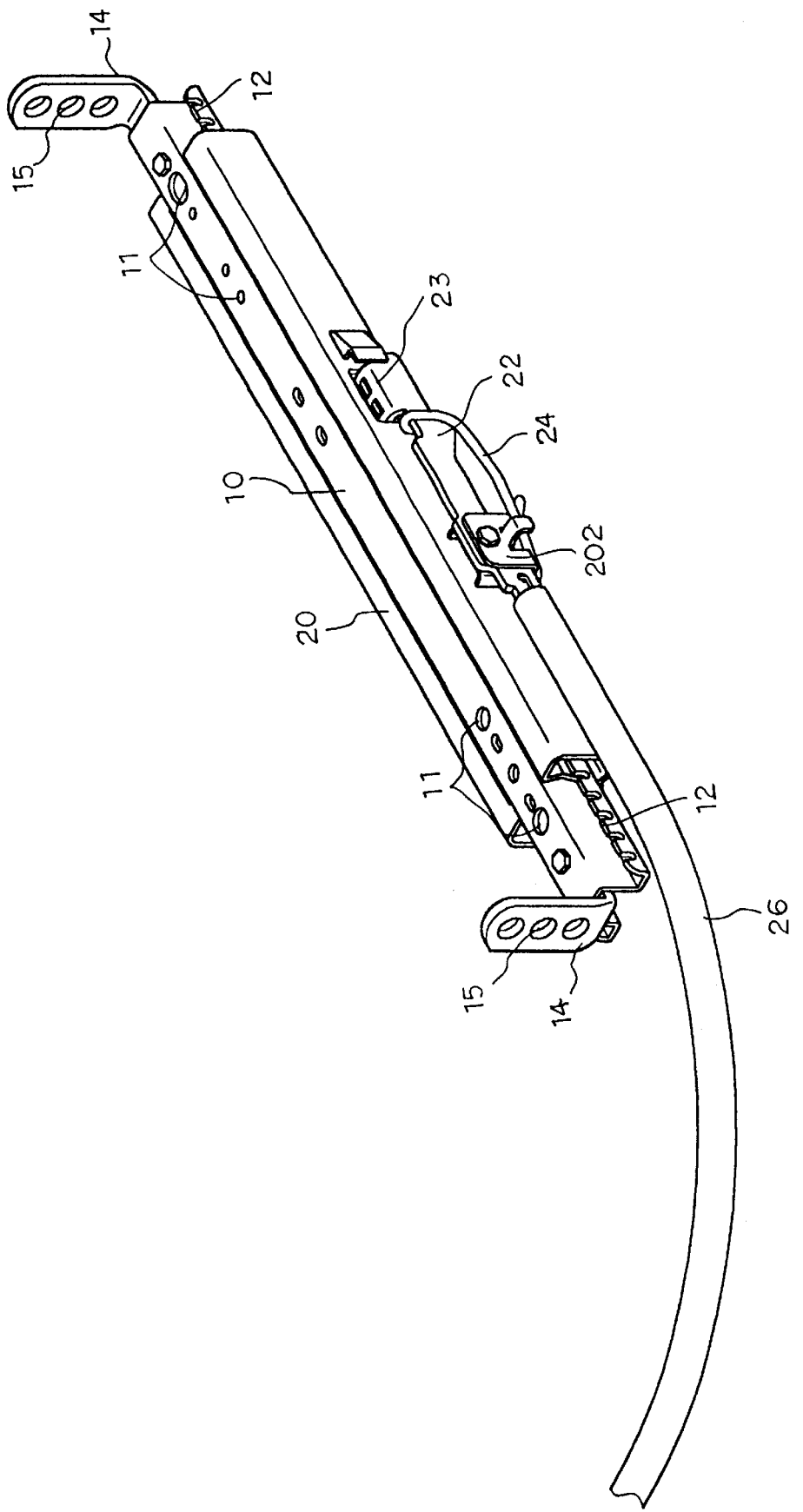
FIG. 4 is a perspective assembled view of the slide rail structure of the present invention.

Please refer to FIGS. 3 and 4. The universal car seat-adjusting slide rail of the present invention is composed of a slide bar 10 and a slide frame 20. The slide bar 10 is supported by multiple ball members and slidably fitted in the slide channel of the slide frame 20. The surface of the slide bar 10 is formed with multiple locating holes 11. Two connecting lugs 14 are respectively detachably locked at two ends of the slide bar 10 by screws. Each lug 14 is formed with multiple through holes 15, whereby a user can selectively connect the slide bar with the bottom or lateral sides of the seat by screws in accordance with the type of the car seat. One side of the slide frame 20 is disposed with a fixing section 201. Ball members 202 and plastic circular rods 203 are placed in the slide frame 20 for the slide bar 10 to smoothly slide therewithin and keep in a balanced state. A middle portion of a clutch control bar 22 is fixed on the fixing section 201 by screws. One end of the clutch control bar 22 is formed with an engaging section 23 which passes through a perforation 21 formed on the slide frame 20 to engage with the teeth 12 of the slide bar 10 so as to engage with and locate the slide bar 10. The other end of the clutch control bar 22 is disposed with a pivot section 221 on which an arch rod 26 is fitted. A fixing spring 222 is passed through the pivot section 221 to prevent the arch rod 26 from detaching from the pivot section 221. In addition, a resilient member 24 is disposed between the fixing section 201 and the clutch control bar 22. One end of the resilient member 24 is wound and fixed on the fixing section 201, while the other end thereof is fixedly engaged with the clutch control bar 22 in reverse direction so as to prevent the resilient member 24 from incautiously separating from the clutch control bar 22 and losing its function. FIG. 4 shows the assembled universal car seat-adjusting slide rail structure of the present invention.

Figure 5:
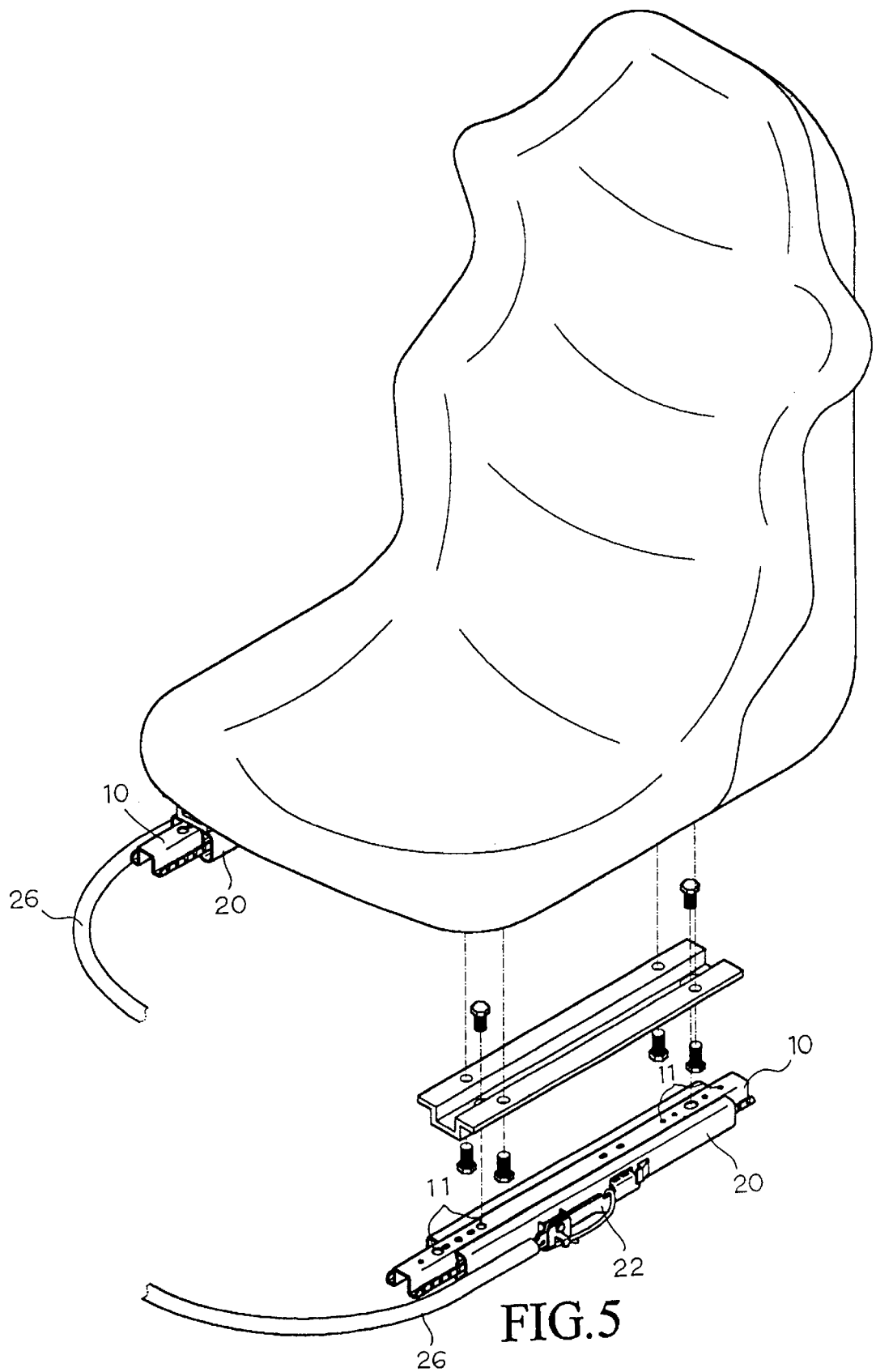
FIG. 5 shows an embodiment of the present invention.
Figure 6:
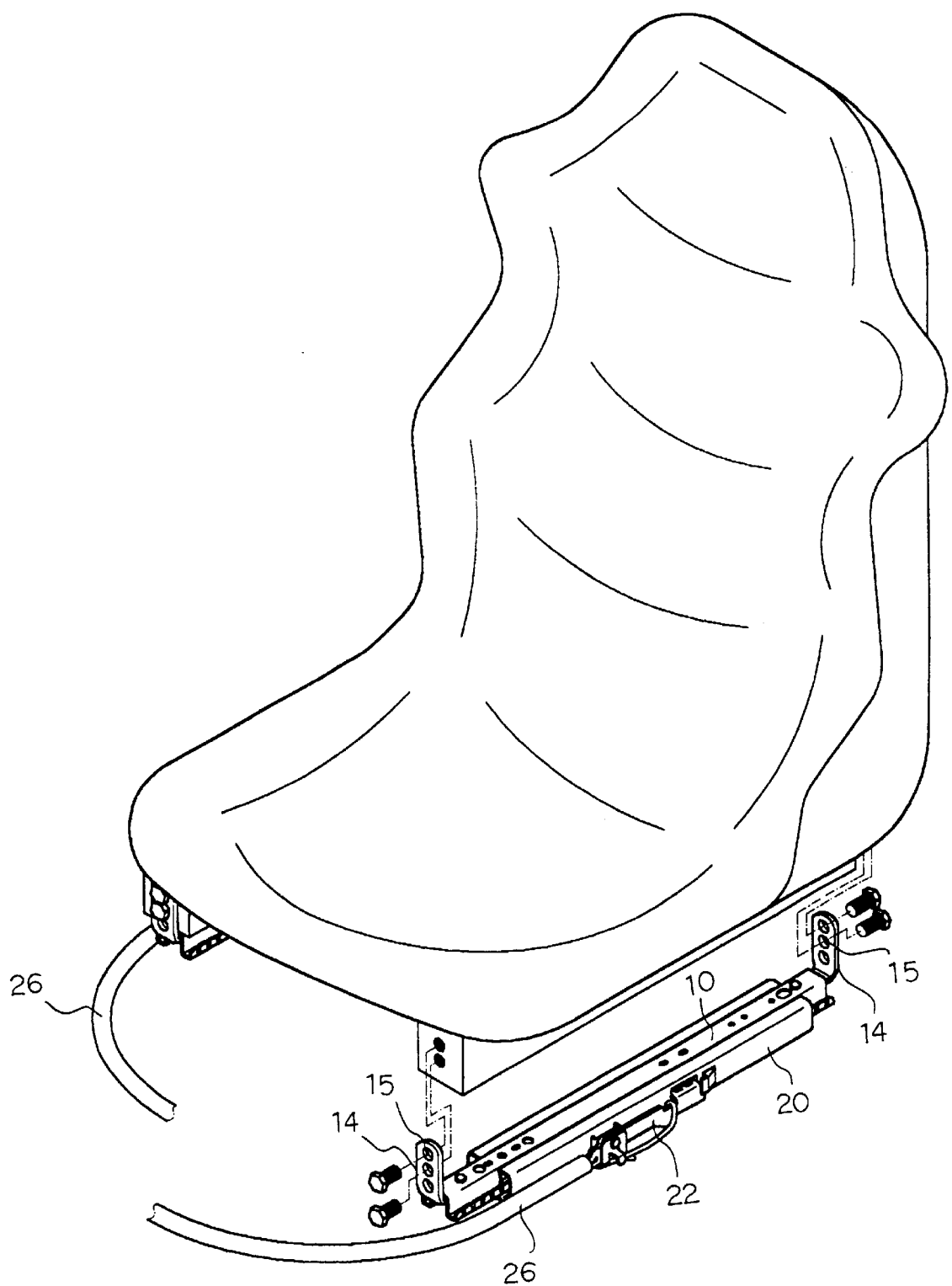
FIG. 6 shows another embodiment of the present invention.
Figure 7:
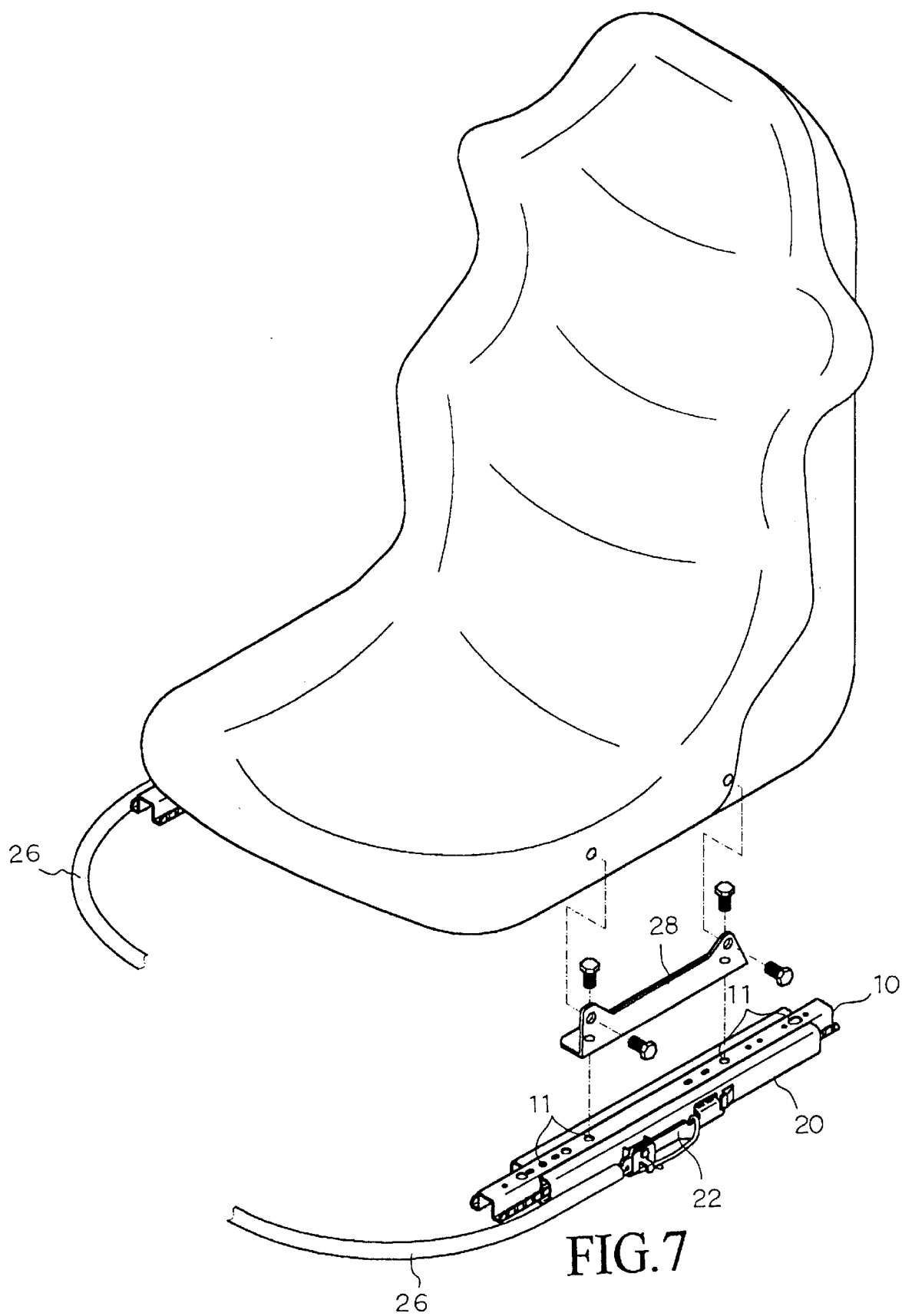
FIG. 7 shows still another embodiment of the present invention.
Figure 8:
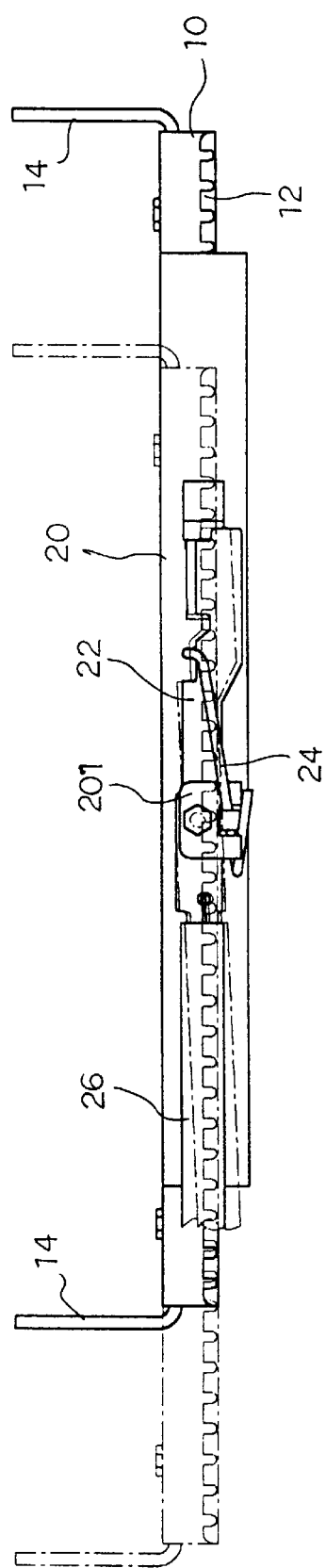
FIG. 8 shows the operation of the slide rail structure of the present invention.

In use, the bottom face of the slide frame 20 is directly fixed on the chassis of the car by screws. Then, according to the type of the car seat, suitable locating holes 11 of the slide bar 10 are selected for locking the slide bar 10 on the bottom face of the seat (as shown in FIG. 5). Alternatively, the detachable lugs 14 of two ends of the slide bar 10 are directly locked on front and rear sides of the seat (as shown in FIG. 6). Still alternatively, through an L-shaped auxiliary board 23, the slide bar 10 is locked on left and right sides of the seat (as shown in FIG. 7). Therefore, the slide bar 10 is applicable to various kinds of car seats. Also, when adjusting the position of the car seat, the arch rod 26 is shifted to drive the clutch control bar 22, making the engaging section 23 thereof disengaged from the teeth 12. At this time, the user via the slide rail can adjust the seat to a comfortable position. After adjusted, the arch rod 26 is released. At this time, the resilient member 24 will resiliently restore the engaging section 23 to re-engage with the teeth 12 so as to locate the slide bar 10 as shown in FIG. 8.

The slide bar 10 is formed with multiple locating holes 11 and can be additionally pivotally detachably connected with the lugs 14 having several through holes 15. Also, the slide bar 10 can be used in cooperation with the L-shaped auxiliary board 28 so that the slide bar 10 can be widely used in different car seats to achieve versatile assembling effect. In addition, the fixing spring 222 is passed through the pivot section 221 of the clutch control bar 22 so that the arch rod 26 is effectively prevented from detaching therefrom. Also, the resilient member 24 is such arranged that the resilient member 24 is prevented from incautiously dropping to lose its function. Accordingly, the slide rail structure of the present invention can be durably used.

The above embodiments are only used to illustrate the present invention, not intended to limit the scope thereof. Many modifications of the above embodiments can be made without departing from the spirit of the present invention.

What is claimed is:

1. A universal car seat-adjusting slide rail structure comprising:

a slide bar and a slide frame, the slide bar being supported by multiple ball members and plastic circular rods and slidably lifted in a slide channel of the slide frame; wherein a surface of the slide bar is formed with multiple locating holes and connecting lugs being respectively detachably locked at two ends of the slide bar by screws, whereby a user can selectively connect the slide bar with the car seat according to the type of car seat, one side of the slide frame being disposed with a clutch control bar having a pivot section for connecting with an arch rod, a fixing spring being passed through the pivot section to prevent the arch rod from being detached from the clutch control bar.

2. The universal car seat-adjusting slide rail structure as claimed in claim 1, wherein:

a resilient member is disposed between a fixing section of the slide frame and the clutch control bar, a first end of the resilient member is wound and fixed on the fixing section, and a second end of the resilient member being fixedly engaged with the clutch control bar in a reverse direction so as to prevent the resilient member from dropping.

3. The universal car seat-adjusting slide rail structure as claimed in claim 1, wherein:

the slide bar is locked on two sides of the car seat via an L-shaped auxiliary board.

\* \* \* \* \*